United States Patent
Seo et al.

(10) Patent No.: US 9,395,592 B2
(45) Date of Patent: Jul. 19, 2016

(54) DISPLAY DEVICE

(71) Applicant: SAMSUNG DISPLAY CO., LTD., Yongin, Gyeonggi-Do (KR)

(72) Inventors: Young Wan Seo, Suwon-si (KR); Yeong-Keun Kwon, Yongin-si (KR); Ji-Sun Kim, Seoul (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 39 days.

(21) Appl. No.: 14/449,703

(22) Filed: Aug. 1, 2014

(65) Prior Publication Data

US 2015/0116615 A1  Apr. 30, 2015

(30) Foreign Application Priority Data

Oct. 28, 2013  (KR) .......................... 10-2013-0128715

(51) Int. Cl.
    *G02F 1/1362* (2006.01)
    *G09G 3/36* (2006.01)

(52) U.S. Cl.
    CPC ........ *G02F 1/136286* (2013.01); *G09G 3/3611* (2013.01); *G09G 3/3614* (2013.01); *G09G 2300/0426* (2013.01); *G09G 2300/0452* (2013.01); *G09G 2320/0204* (2013.01)

(58) Field of Classification Search
    CPC ........... G02F 1/136286; G09G 3/3611; G09G 3/3614; G09G 2320/0204; G09G 2300/0426; G09G 2300/0452; G09G 2310/06
    USPC ........................... 349/37, 43; 345/96, 54, 209
    See application file for complete search history.

(56) References Cited

U.S. PATENT DOCUMENTS

| | | | | |
|---|---|---|---|---|
| 6,919,681 B2* | 7/2005 | Cok | ..................... | G09G 3/3216 313/500 |
| 8,395,742 B2* | 3/2013 | Yokoyama | ........ | G02F 1/136213 349/145 |
| 2005/0275610 A1* | 12/2005 | Roh | ..................... | G09G 3/3614 345/88 |
| 2008/0024418 A1* | 1/2008 | Kim | ..................... | G09G 3/3648 345/98 |
| 2008/0278466 A1* | 11/2008 | Joo | ..................... | G09G 3/3614 345/205 |
| 2009/0195492 A1 | 8/2009 | Takahashi | | |
| 2011/0156992 A1* | 6/2011 | Moon | .................. | G09G 3/3607 345/84 |
| 2012/0013817 A1* | 1/2012 | Kim | .................. | G02F 1/134363 349/41 |
| 2012/0113340 A1 | 5/2012 | Yaguma et al. | | |

FOREIGN PATENT DOCUMENTS

| | | | |
|---|---|---|---|
| JP | 2006106062 A | * | 4/2006 |
| JP | 4578915 B2 | | 9/2010 |
| KR | 10-2005-0113907 A | | 12/2005 |
| KR | 10-0816338 B1 | | 3/2008 |
| KR | 10-0898787 B1 | | 5/2009 |
| KR | 10-0919191 B1 | | 9/2009 |
| KR | 10-2010-0030173 A | | 3/2010 |
| KR | 10-2010-0129666 A | | 12/2010 |
| KR | 10-2011-0077899 A | | 7/2011 |
| KR | 10-1174162 B1 | | 8/2012 |

\* cited by examiner

*Primary Examiner* — Michael Caley
*Assistant Examiner* — Jia Pan
(74) *Attorney, Agent, or Firm* — Lee & Morse, P.C.

(57) ABSTRACT

A display device includes pixels, gate lines, and data lines on a substrate. The pixels include sub-pixels, and each sub-pixel includes a respective one of a plurality of first electrodes connected to one of the gate lines and one of the data lines. The first electrode of the sub-pixel at an n-th row and the first electrode of the sub-pixel at an (n+2)-th row in a same column are connected to different ones of the data lines. The sub-pixels in the n-th and (n+2)-th rows in the same column emit the same color of light.

15 Claims, 7 Drawing Sheets

DISPLAY DEVICE

CROSS-REFERENCE TO RELATED APPLICATION

Korean Patent Application No. 10-2013-0128715, filed on Oct. 28, 2013, and entitled, "DISPLAY DEVICE," is incorporated by reference herein in its entirety.

BACKGROUND

1. Field

One or more embodiments described herein relate to a display device.

2. Description of the Related Art

Liquid crystal displays (LCDs) are one of the most widely used flat panel displays. An LCD includes a liquid crystal (LC) layer between a pair of panels. Each panel includes field-generating electrodes, which, for example, may be pixel and common electrodes. When voltages are applied to the electrodes, an electric field is generated in the LC layer. The electric field controls the orientation of LC molecules in in the LC layer, which adjust the polarization of incident light. An image is then generated based on this light.

An LCD display may also include color filters that output color (e.g., red, green, and/or blue) light. Other LCDs include white sub-pixels for increasing luminance.

When one pixel is formed of four sub-pixels, even-numbered sub-pixels are repeated. This may cause display degradation under certain circumstances. For example, the same polarity may appear by a line unit when displaying a single-color pattern.

SUMMARY

In accordance with one embodiment, a display device includes a substrate including a plurality of pixels; a plurality of gate lines on the substrate; a plurality of data lines on the substrate; and a plurality of first electrodes, each of the first electrodes connected to one of the gate lines and one of the data lines, wherein each of the pixels includes a plurality of sub-pixels, each sub-pixel includes a respective one of the first electrodes, and the first electrode of the sub-pixel at an n-th row and the first electrode of the sub-pixel at an (n+2)-th row in a same column are connected to different ones of the data lines, the sub-pixels in the n-th row and (n+2)-th row in the same column to emit a same color of light.

The gate lines may extend in a row direction, the data lines may extend in a column direction, and the sub-pixels of each of the pixels may be disposed in the row direction. The data lines of even-numbered columns and data lines of odd-numbered columns may carry data signals of different polarities. The first electrode of the sub-pixel in the n-th row and first electrode of the sub-pixel in the (n+2)-th row in the same column may carry data signals of different polarities.

The first electrode of a sub-pixel in an m-th column and the first electrode of a sub-pixel in an (m+4)-th column in a same row may be connected to different gate lines, and the first electrodes of the sub-pixels in an m-th column and an (m+4)-th column may emit same color of light.

The first electrode of the sub-pixel in the m-th column and the first electrode of the sub-pixel in the (m+4)-th column in a same row may carry data signals of different polarities. The first electrodes of pixels in odd-numbered columns in a same row may be connected to a data line at first sides of the first electrodes and one of the gate lines at a second side of the first electrodes.

The first electrodes of sub-pixels in even-numbered columns in a same row may be connected to one of the data lines at a third side of the first electrodes and one of the gate lines at fourth sides of the first electrodes.

The first electrodes of sub-pixels at odd-numbered columns in a same row may be connected to one of the data lines at a first side of the first electrodes and one of the gate lines at a second side of the first electrodes. The first electrodes of sub-pixels at even-numbered columns in a same row may be connected to one of the data lines at a third side of the first electrodes and one of the gate lines at a fourth side of the first electrodes.

The first electrodes of pixels in the n-th row and an (n+3)-th row in a same column may be connected to one of the data lines at a first side of the first electrodes and one of the gate lines at a second side of the first electrodes.

The first electrodes of pixels in an (n+1)-th row and the (n+2)-th row in a same column may be connected to one of the data lines at a third side of the first electrodes and one of the gate lines at a fourth side of the first electrodes.

The first electrodes of pixels in the n-th row and an (n+3)-th row in a same column may be connected to one of the data lines at a first side of the first electrodes and one of the gate lines at a second side of the first electrodes.

The first electrodes of pixels in an (n+1)-th row and the (n+2)-th row in a same column may be connected to one of the data lines at a third side of the first electrodes and one of the gate lines at a fourth side of the first electrodes.

Each of the first electrodes may be connected to one of the gate lines and one of the data lines through a switching element. The switching element may include a gate electrode extending from one of the gate lines; a semiconductor on the gate electrode; a source electrode connected to one of the data lines and overlapping the gate electrode; and a drain electrode spaced from the source electrode and overlapping the gate electrode.

The overlapping portion of the drain and gate electrodes may have one of substantially an I shape, an L shape, or a T shape. The sub-pixels of each of the pixels may include a red sub-pixel, a green sub-pixel, a blue sub-pixel, and a white sub-pixel. The sub-pixels of adjacent pixels in a row may be arranged in a same sequence; and sub-pixels of adjacent pixels in a column may be arranged in a different sequence. Each sub-pixel may include a second electrode which overlaps the first electrode via an insulating layer

BRIEF DESCRIPTION OF THE DRAWINGS

The above and other features and advantages will become more apparent to those of skill in the art by describing in detail exemplary embodiments with reference to the attached drawings, in which.

DETAILED DESCRIPTION

Figure 1:
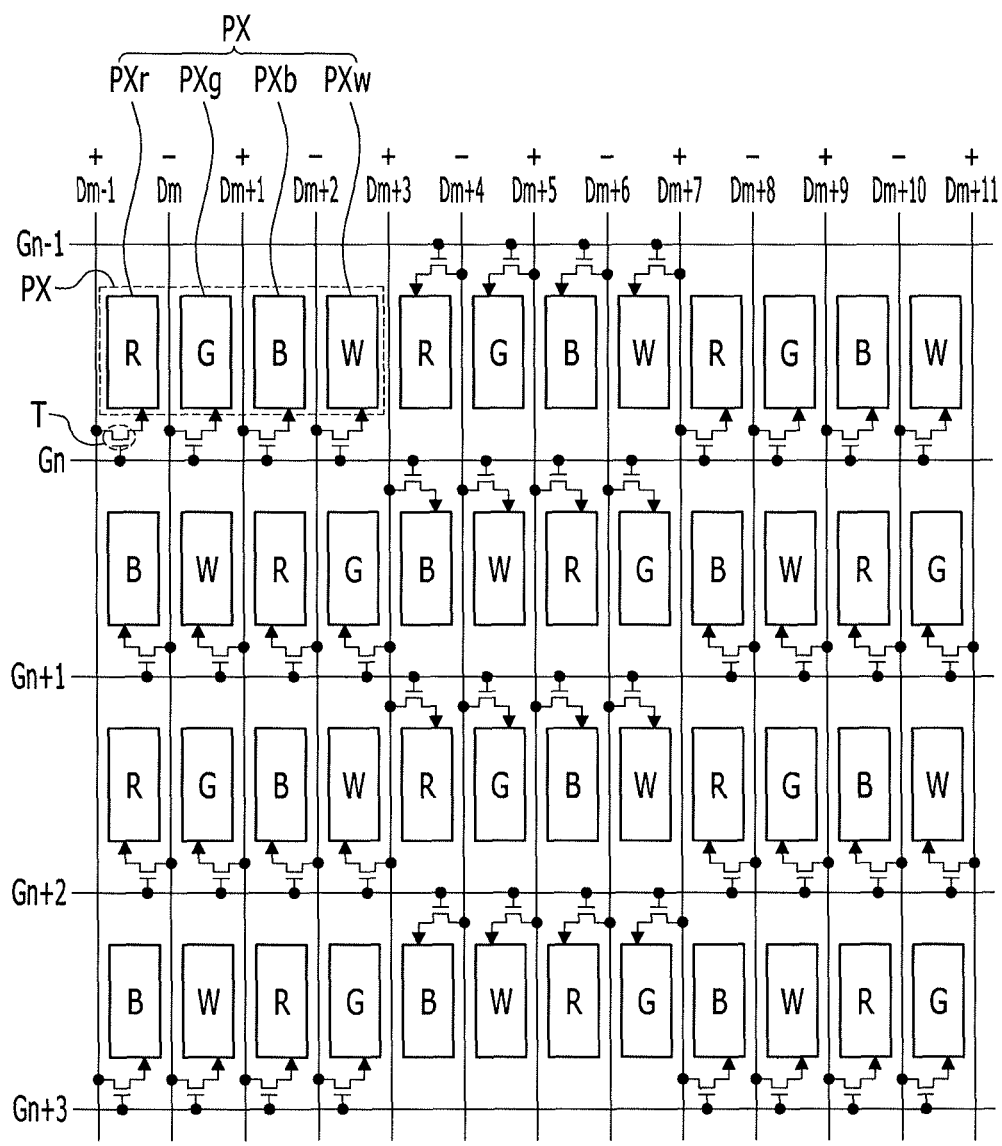
FIG. 1 illustrates an embodiment of a display device.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates an embodiment of a display device which includes a plurality of gate lines G(n−1), Gn, . . . , G(n+4) and a plurality of data lines D(m−1), Dm, . . . , D(m+12) on a substrate which includes a plurality of pixels PX.

Each pixel PX may include four sub-pixels. The four sub-pixels may be a red sub-pixel PXr, a green sub-pixel PXg, a blue sub-pixel PXb, and a white sub-pixel PXw. The red sub-pixel PXr includes a red filter to transmit red light. The green sub-pixel PXg includes green filter to transmit green light. The blue sub-pixel PXb includes a blue filter to transmit blue light. The white sub-pixel PXw transmit white light and may be included, for example, to improve luminance. In other embodiments, each pixel PX may transmit one or more different colors, e.g., cyan, magenta, and/or yellow.

The pixels PX are disposed in a matrix shape including rows and columns. An arrangement sequence of the subpixels of the pixels PX adjacent to each other in the row direction is the same. For example, as shown in FIG. 1, the pixel PX in the first row and first column includes red sub-pixel PXr, green sub-pixel PXg, blue sub-pixel PXb, and white sub-pixel PXw sequentially disposed. The pixel PX in the first row and the second column includes red sub-pixel PXr, green sub-pixel PXg, blue sub-pixel PXb, and white sub-pixel PXw sequentially disposed.

The arrangement sequence of the sub-pixels of the pixels PX adjacent in the column direction may be formed differently. For example, the pixel PX of the second row and first column may include blue sub-pixel PXb, white sub-pixel PXw, red sub-pixel PXr, and green sub-pixel PXg sequentially disposed in the column direction. Accordingly, the sub-pixels PXr, PXg, PXb, and PXw adjacent in the column direction may display different colors. For example, the red sub-pixel PXr may be adjacent to the blue sub-pixel PXb in the column direction, and the green sub-pixel PXg may be adjacent to the white sub-pixel PXw in the column direction.

The gate lines G(n−1), Gn, . . . , G(n+4) extend in the row direction and transmit gate voltages. The gate voltages may include a gate-on voltage and a gate-off voltage.

The data lines D(m−1), Dm, . . . , D(m+12) extend in the column direction and transmit data signals. Data signals of different polarities are applied to data lines Dm, D(m+2), . . . , D(m+12) of even-numbered columns and data lines D(m−1), D(m+1), . . . , D(m+11) of odd-numbered column. For example, positive polarity data signals may be applied to data lines D(m−1), D(m+1), . . . , D(m+11) of odd-numbered columns, and negative polarity data signals may be applied to data lines Dm, D(m+2), . . . , D(m+12) of even-numbered columns. In a next frame, positive polarity data signals may be applied to data lines Dm, D(m+2), . . . , D(m+12) of even-numbered column, and negative polarity data signals may be applied to data lines D(m−1), D(m+1), . . . , D(m+11) of odd-numbered columns.

For sub-pixels PXr, PXg, PXb, and PXw, a first electrode 191 (see FIG. 2) is connected to respective gate and data lines. The first electrode 191 may be connected to respective gate and data lines through a switching element T. The switching element T may be made of a three-terminal element, e.g., a thin film transistor. When the gate-on voltage is applied, the switching element T is turned on to transmit the data signal to first electrode 191 through a respective data line. When the gate-off voltage is applied, the switching element T is turned off to maintain the pixel voltage applied to the first electrode 191 corresponding to the data signal.

In accordance with one connection arrangement, first electrodes 191 of the pixel in the first row and the first column are connected to respective data lines D(m−1), Dm, D(m+1), and D(m+2). The data lines are located left of the first electrodes 191. Also, the first electrodes 191 are connected to a gate line Gn below the first electrodes 191.

The first electrodes 191 of the pixel in the first row and the second column are respectively connected to data lines D(m+4), D(m+5), D(m+6), and D(m+7). These data lines are located on right sides of the first electrodes 191. Also, these first electrodes 191 are connected to the gate line G(n−1) above the first electrodes 191.

The first electrodes 191 of the pixel of the second row and the first column are respectively connected to the data lines Dm, D(m+1), D(m+2), and D(m+3) and the gate line G(n+1). These data lines are right of the first electrodes 191 and the gate line G(n+1) is located at the lower side of the first electrode 191.

The first electrodes 191 of the pixel of the second row and the second column are respectively connected to the data lines D(m+3), D(m+4), D(m+5), and D(m+6) and the gate line (Gn). These data lines are left of the first electrodes 191 and the gate line (Gn) above the first electrode 191.

The first electrodes 191 of the pixel of the third row and first column are respectively connected to the data lines Dm, D(m+1), D(m+2), and D(m+3) and the gate line G(n+2). These data lines are right of the first electrodes 191 and the gate line (Gn+2) below the first electrode 191.

The first electrodes 191 of the pixel of the third row and the second column are respectively connected to the data lines D(m+3), D(m+4), D(m+5), and D(m+6) and the gate line G(n+1). These data lines are left of the first electrode 191 and the gate line (Gn) above the first electrode 191.

The first electrodes 191 of the pixel of the fourth row and the first column are respectively connected to the data lines D(m−1), Dm, D(m+1), and D(m+2) and the gate line G(n+3). These data lines are left of the first electrode 191 and the gate line (Gn+3) below the first electrode 191.

The first electrodes 191 of the pixel of the fourth row and the second column are respectively connected to the data lines D(m+4), D(m+5), D(m+6), and D(m+7) and the gate line G(n+2). These data lines are located at right sides of the first electrode 191 and the gate line (Gn+2) above the first electrode 191.

The connection relationship of the first electrode 191, the gate lines G(n−1), Gn, . . . , G(n+4), and the data lines D(m−1), Dm, . . . , D(m+12) may be repeated in intervals of eight pixels. For example, the first electrodes 191 at the pixel of the first row and the third column are respectively connected to the data lines D(m+7), D(m+8), D(m+9), and D(m+10) left of the first electrodes 191 and the gate line(Gn) below the first electrodes 191. The pixel PX of the fifth row and the first column may have the same connection relationship as the pixel of the first row and the first column.

The connection relationship of the first electrode 191, gate lines G(n−1), Gn, . . . , G(n+4), and data lines D(m−1), Dm, . . . , D(m+12) will be described for the pixel positioned at the same row or the pixel positioned at the same column.

In the case of the pixel of the first row and the third row, for pixels in the same row, the first electrodes 191 of pixels at odd-numbered columns are respectively connected to the data lines left of the first electrodes 191. Gate line G below the first electrodes 191. For pixels in the same row, the first electrodes 191 of pixels at even-numbered columns are connected to the data lines D right of the first electrodes. The gate line is above these first electrodes 191.

In the case of the pixel of the second row and the fourth row, for pixels in the same row, the first electrodes 191 of pixels at odd-numbered columns are respectively connected to the data lines right of the first electrodes 191 and the gate line below the first electrodes 191. For pixels in the same row, the first electrodes 191 of pixels in even-numbered columns are respective connected to the data lines left of the first electrodes 191 and the gate line G above these first electrodes 191.

Accordingly, for sub-pixels PXr, PXg, PXb, and PXw in the same row, the first electrodes 191 of these sub-pixels at the m-th column and the first electrodes 191 of the sub-pixels at the (m+4)-th column are connected to different gate lines, display the same color, and receive data signals of different polarities. For example, the first electrodes 191 of the sub-pixels PXr, PXg, PXb, and PXw adjacent in the row direction and displaying the same color receive data signals of different polarities.

In the case of the pixel of the first column and the third column, for pixels in the same column, the first electrodes 191 at the n-th row and (n+3)-th row are connected to respective data lines left of the first electrodes 191 and the gate line below these first electrodes 191. For the pixels in the same column, the first electrodes of the pixels at the (n+1)-th row and the (n+2)-th row are respectively connected to the data lines right of the first electrodes 191 and the gate line is below these first electrodes 191.

In the case of the pixels in the second column, the first electrodes 191 of the pixel at the n-th row and (n+3)-th row are respectively connected to the data lines right of these first electrodes 191 and the gate line above these first electrodes 191. For pixels in the same column, the first electrodes 191 of the pixels at the (n+1)-th row and (n+2)-th row are respectively connected to the data lines left of the first electrodes 191 and the gate lines G above these first electrodes 191.

For sub-pixels in the same column, the first electrodes 191 of the sub-pixels PXr, PXg, PXb, and PXw at the n-th row and the first electrodes 191 of the sub-pixels PXr, PXg, PXb, and PXw at the (n+2)-th row are connected to different data lines and receive data signals of different polarities. For example, the first electrode 191 of the sub-pixels PXr, PXg, PXb, and PXw, which are adjacent in the column direction and display the same color, receive data signals of different polarities.

Figure 2:
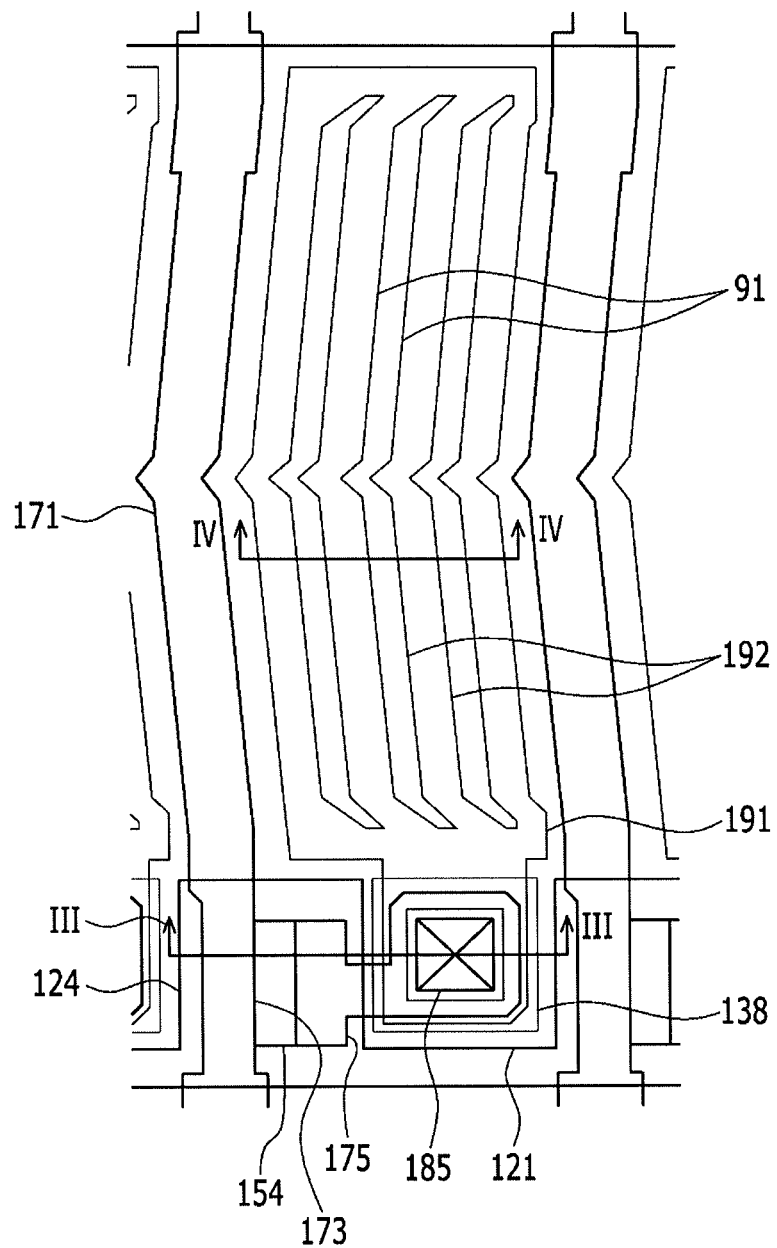
FIG. 2 illustrates a plan view of an embodiment of a pixel.
Figure 3:
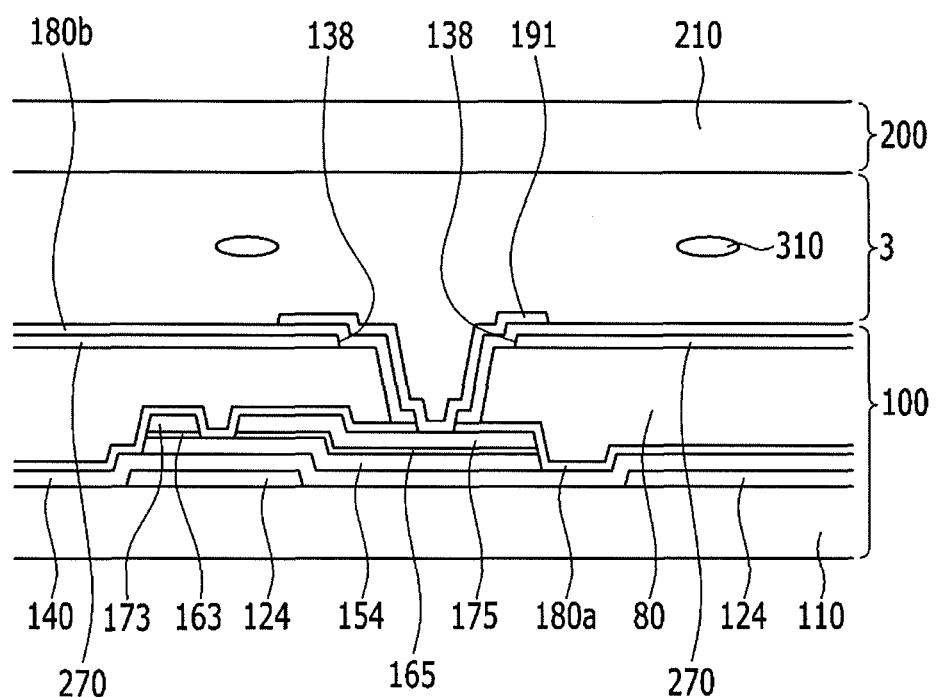
FIG. 3 illustrates a view of the display device along section line III-III of FIG. 2.
Figure 4:
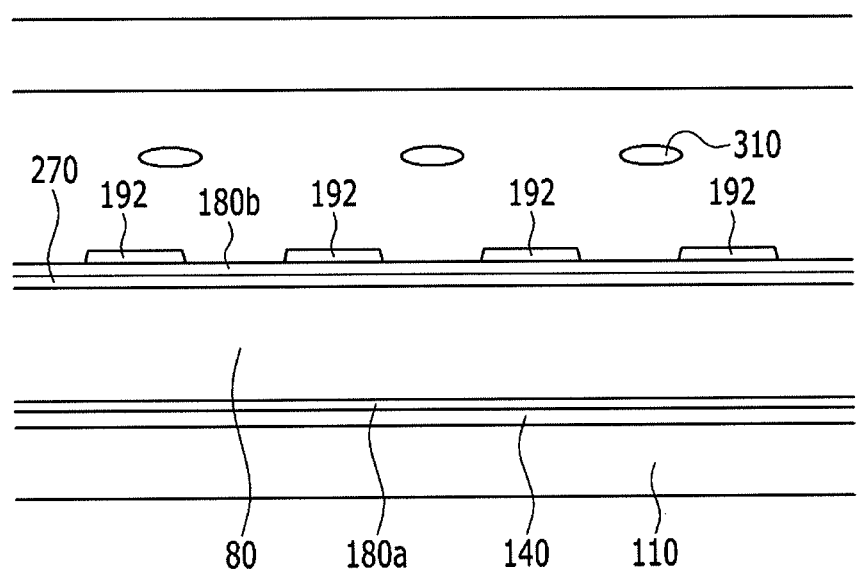
FIG. 4 illustrates a view of the display device along section line IV-IV of FIG. 2.

FIG. 2 illustrates an embodiment of a pixel, FIG. 3 is a cross-sectional view of the display device in FIG. 2 taken along line III-III, and FIG. 4 is a cross-sectional view of the display device in FIG. 2 taken along line IV-IV. Referring to FIG. 2 to FIG. 4, the display device includes a lower panel 100 facing an upper panel 200, and a liquid crystal layer 3 interposed therebetween.

The lower panel 100 includes a gate line 121 formed in a row direction on a first substrate 110, which, for example, may be made of transparent glass or plastic. A gate electrode 124 protrudes from the gate line 121.

The gate line 121 and the gate electrode 124 may be made of a material such as an aluminum-based metal of aluminum (Al) or aluminum alloys, a silver-based metal of silver (Ag) or silver alloys, a copper-based metal copper (Cu) or copper alloys, a molybdenum-based metal of molybdenum (Mo) or molybdenum alloys, chromium (Cr), tantalum (Ta), or titanium (Ti). In other embodiments, the gate line 121 may be made of a multilayered structure including at least two conductive layers having different physical properties.

A gate insulating layer 140 is formed on the gate line 121 and the gate electrode 124. The gate insulating layer 140 may be made, for example, of a silicon nitride (SiNx) or a silicon oxide (SiOx). The gate insulating layer 140 may have a multilayered structure including at least two conductive layers having different physical properties.

A semiconductor 154 is formed on the gate insulating layer 140. The semiconductor 154 may include amorphous silicon, polysilicon, or an oxide semiconductor.

The ohmic contacts 163 and 165 are formed on the semiconductor 154. The ohmic contacts 163 and 165 may be made of a material such as n+ hydrogenated amorphous silicon (in which an n-type impurity (e.g., phosphorus) is doped at a high concentration) or silicide. The ohmic contacts 163 and 165 may be disposed as a pair on the semiconductor 154. When the semiconductor 154 is formed of oxide semiconductor, the ohmic contacts 163 and 165 may be omitted.

A data line 171 is formed on the ohmic contacts 163 and 165 and the gate insulating layer 140. A source electrode 173 may be connected to the data line 171 and may overlap the gate electrode 124. A drain electrode 175 may be separated from the source electrode 173 and may overlap gate electrode 124. Thus, the source electrode 173 and the drain electrode 175 may be separated from each other on the gate electrode 124.

Each data line 171 may have first bent portions having a shape to obtain a maximum or predetermined transmittance of the display device. The first bent portions of the data lines 171 may be connected in a middle region of the pixel region to form, for example, a V shape. A second bent portion, oriented at predetermined angles with the first bent portions, may be included in the middle region of the pixel region.

The source electrode 173 may be on the same line as the data line 171. The drain electrode 175 may extend parallel to the source electrode 173. Accordingly, the drain electrode 175 may be parallel to a portion of the data line 171. The portion of the drain electrode 175 which overlaps the gate electrode 124 may form a T shape. In other embodiments, a different shape (e.g., an L shape) may be formed.

The thin film transistor array panel may include the source electrode 173 on the same line as the data line 171. Drain electrode 175 may extend parallel to the data line 171, to increase a width of the thin film transistor while the area of the data conductor is not increased. As a result, an opening ratio of the display device may be increased.

The data line 171, the source electrode 173, and the drain electrode 175 may be formed, for example, of a refractory metallic material such as molybdenum, chromium, tantalum, titanium, or an alloy thereof. Alternatively, the data line 171, the source electrode 173, and the drain electrode 175 may have a multilayered structure of a refractory metal layer and a conductive layer having low resistance. Examples of such a multilayered structure include a two-layer structure that includes a chromium or molybdenum (alloy) layer serving as a lower layer and an aluminum (alloy) layer serving as an upper layer. An example of a three-layer structure includes molybdenum (alloy) layer serving as a lower layer, an aluminum (alloy) layer serving as an intermediate layer, and a molybdenum (alloy) layer serving as an upper layer.

The gate electrode 124, the source electrode 173, and the drain electrode 175 form a thin film transistor (TFT) along with the semiconductor 154. A channel of the thin film transistor is formed in the semiconductor 154 between the source electrode 173 and the drain electrode 175.

A first passivation layer 180a is disposed on the data line 171, the source electrode 173, the drain electrode 175, the gate insulating layer 140, and an exposed portion of semiconductor 154. The first passivation layer 180a may be made of an organic insulating material or an inorganic insulating material.

A color filter 80 is formed on the first passivation layer 180a. The color filter 80 may be formed, for example, of an organic insulator. The color filters 80 for the sub-pixels of each pixel may uniquely output light various colors, e.g., red, green, and blue, or yellow, cyan, and magenta. The color filters may include a color filter displaying a mixture of the two or more of the aforementioned colors, or white in addition to the aforementioned colors.

An overcoat may be formed on the color filter 80. The overcoat may include an inorganic insulating material or organic insulating material.

A second electrode 270 is formed on the color filter or overcoat. The second electrode 270 may have a planar shape and may be formed on the entire surface of the first substrate 110 as an integrated plate. The second electrode 270 may have an opening 138 formed in a region around the drain electrode 175. The second electrode 270 may form, for example, a plate-shaped plane.

The second electrodes 270 at adjacent pixels may be connected to each other, and may receive a common voltage having a predetermined magnitude supplied outside a display region.

A second passivation layer 180b is formed on the second electrode 270. The second passivation layer 180b may be made of an organic or inorganic insulating material.

The first electrode 191 is formed on the second passivation layer 180b. The first electrode 191 includes a curved edge that may be almost parallel to the first bent portion and second bent portion of the data line 171. The first electrode 191 has a plurality of first cutouts 91, and may include a plurality of first branch electrodes 192 defined by the first cutouts 91.

The first passivation layer 180a and second passivation layer 180b have a contact hole 185 exposing drain electrode 175. The first electrode 191 is physically and electrically connected to the drain electrode 175 through the contact hole 185, to thereby receive the voltage from the drain electrode 175.

A first alignment layer is formed on the second passivation layer 180b and the first electrode 191. The first alignment layer may be a horizontal alignment layer, may be aligned in a predetermined direction, and may be a photo-alignment layer.

The upper panel 200 may include a second alignment layer formed on a second substrate 210 made of transparent glass, plastic, or the like. The second alignment layer may be a horizontal alignment layer, may be aligned in a predetermined direction, and may be a photo-alignment layer.

The liquid crystal layer 3 includes a liquid crystal material, which, for example, may have a positive dielectric anisotropy.

Liquid crystal molecules 310 of the liquid crystal layer 3 may have a direction of a major axis arranged in parallel with the display panels 100 and 200.

The first electrode 191 receives a data voltage from the drain electrode 175 and the data line 171. The second electrode 270 receives a common voltage having a predetermined magnitude from a common voltage applying unit disposed outside the display region.

The first electrode 191 and the second electrode 270 are field-generating electrodes that generate an electric field. The liquid crystal molecules 310 of the liquid crystal layer 3 positioned on the two field generating electrodes 191 and 270 may rotate in a direction parallel to a direction of the electric field. Polarization of light passing through the liquid crystal layer is changed according to a rotating direction of the liquid crystal molecules.

The two field generating electrodes 191 and 270 may be formed on the one display panel 100, to thereby increase transmittance of the display device and implement a relatively wide viewing angle.

In the present embodiment, the second electrode 270 has a plate-plane shape and the first electrode 191 has a plurality of branch electrodes. Alternatively, the first electrode 191 may have a plate-plane shape and the second electrode 270 may have a plurality of branch electrodes.

The arrangement shape of the thin film transistor, first electrode, and second electrode may be according to the example previously described. In other embodiments, the second electrode may be disposed on the second substrate, rather than the first substrate.

Figure 5:
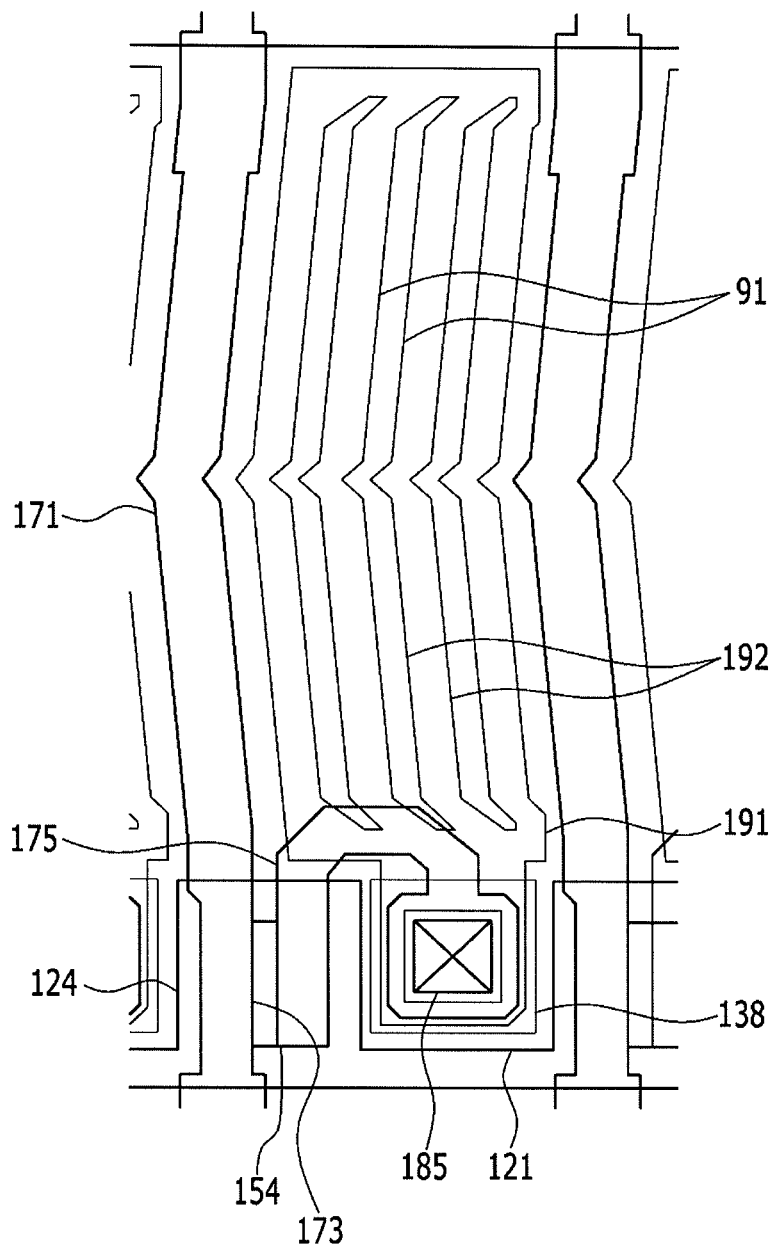
FIG. 5 illustrates a plan view of another embodiment of a pixel.

FIG. 5 illustrates another embodiment of a pixel. This embodiment may be the same as the previous embodiment in FIGS. 2 to 4, except that for the shape of the portion of the drain electrode overlapping the gate electrode.

In the previous embodiment, the portion of drain electrode 175 that overlaps the gate electrode 124 may have a T or an L shape. In this embodiment, the portion of the drain electrode 175 overlapping the gate electrode 124 has an I shape.

The drain electrode 175 and the gate electrode 124 are formed through different photo and etching processes using different masks. At least one of a mask used for patterning the drain electrode 175 or a mask used for patterning the gate electrode 124 may be misaligned.

In the previous embodiment, when a misalignment of a right-left direction of the mask occurs, the overlapping area between the drain electrode 175 and the gate electrode 124 may be changed. For example, the overlapping area between the drain electrode 175 and the gate electrode 124 may include a portion extending in a horizontal direction and a portion extending in a vertical direction. Also, the area of the portion extending in the horizontal direction may be changed when misalignment of the right-left direction of the mask occurs, In the present embodiment, the overlapping portion of the drain electrode 175 and the gate electrode 124 has an P shape which includes the portion only extending in the vertical direction. Accordingly, when misalignment of the right and left directions of the mask occurs, the area of the overlapping portion of the drain electrode 175 and the gate electrode 124 is not changed.

Figure 6:
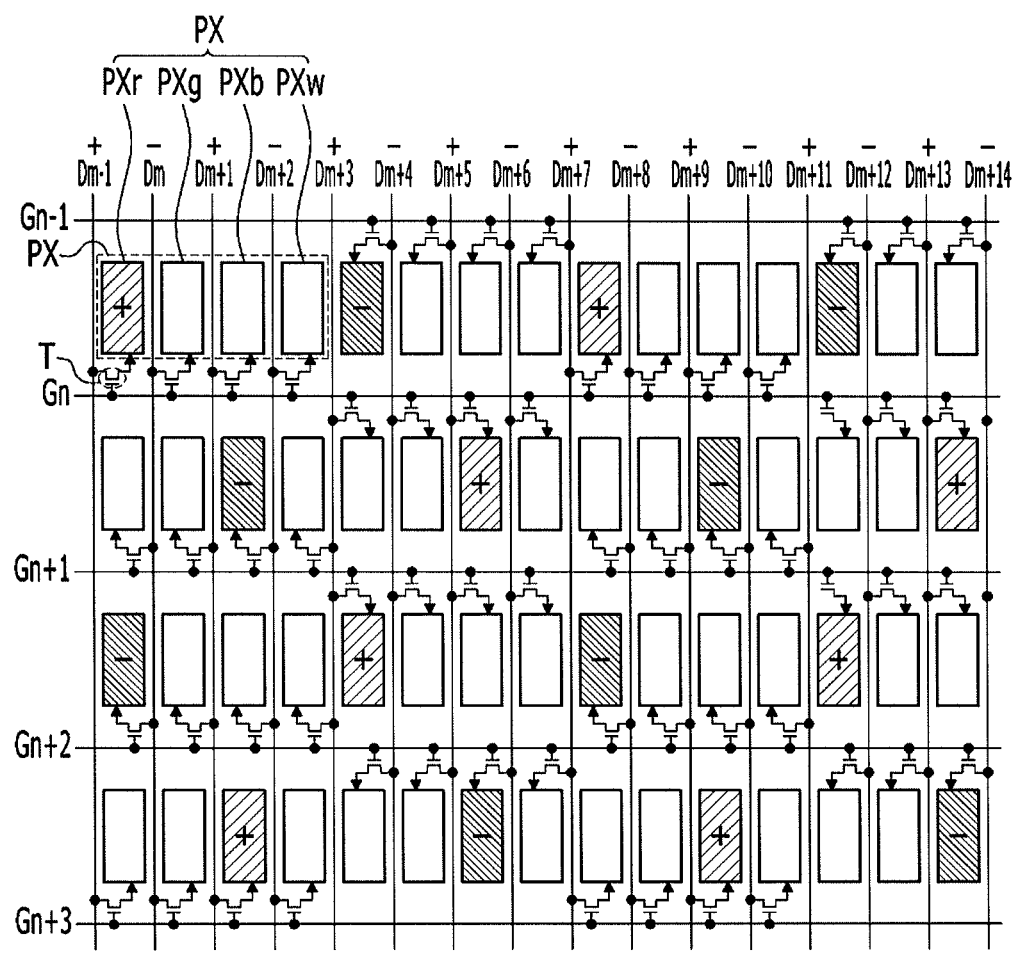
FIGS. 6 and 7 illustrate polarities of sub-pixels for a single-color pattern.

FIG. 6 illustrates different embodiments of polarities of sub-pixels for displaying a single-color pattern. Referring to FIG. 6, the display device only applies data signals of high gray scale values to red sub-pixels PXr. The display device, therefore, displays the single-color pattern that entirely represents red.

The red sub-pixels PXr positioned at the first row sequentially have a positive polarity, negative polarity, positive polarity, and negative polarity from the left side. The red sub-pixels PXr positioned at the second row have negative polarity, positive polarity, negative polarity, and positive polarity starting from the left side. The red sub-pixels PXr which are adjacent in the row direction and display the same color, therefore, have different polarities.

The red sub-pixels PXr positioned at the first column sequentially have positive polarity and negative polarity starting from the upper side. The red sub-pixels PXr positioned at the third column sequentially have negative polarity and positive polarity starting from the upper side. The red sub-pixels PXr which are adjacent in the column direction and display the same color, therefore, have different polarities.

By providing different polarities to sub-pixels PXr, PXg, PXb, and PXw in the same column and same row and which are adjacent with the same color, horizontal crosstalk may be prevented when displaying a single color-pattern.

Figure 7:
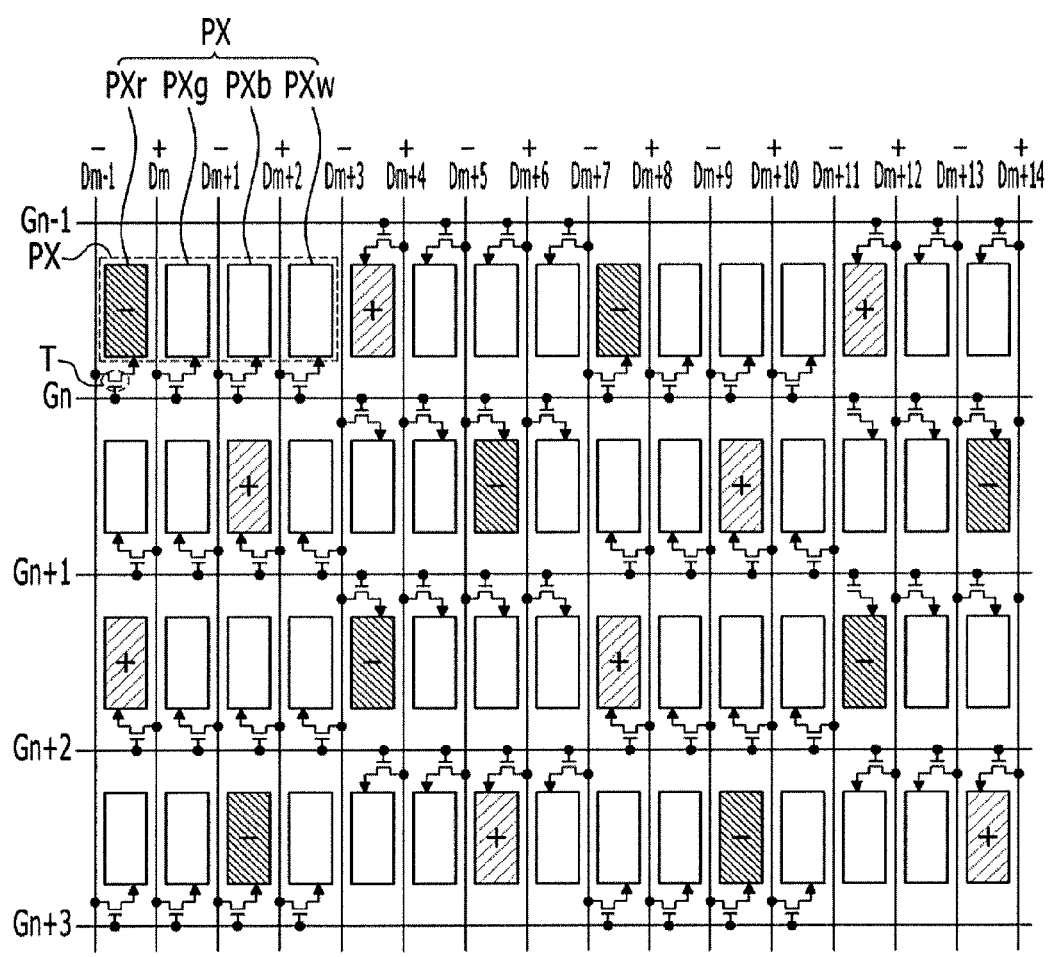

FIG. 7 illustrates data signals having opposite polarities to the polarities in FIG. 6 in a next frame. The red sub-pixels PXr in the first row sequentially have negative polarity, positive polarity, negative polarity, and positive polarity starting from the left side. The red sub-pixels PXr in the second row have positive polarity, negative polarity, positive polarity, and negative polarity starting from the left side. Thus, a polarity inversion is generated for between adjacent frames. Also, red sub-pixels PXr which are adjacent in the row direction and display the same color, therefore, have different polarities.

The red sub-pixels PXr in the first column sequentially have negative polarity and positive polarity starting from the upper side. The red sub-pixels PXr in the third column sequentially have positive polarity and negative polarity starting from the upper side. The red sub-pixels PXr which are adjacent in the column direction and display the same color, therefore, have different polarities.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A display device, comprising:
   a substrate including a plurality of pixels;
   a plurality of gate lines on the substrate in a row direction;
   a plurality of data lines on the substrate in a column direction; and
   a plurality of first electrodes, each of the first electrodes connected to one of the gate lines and one of the data lines, each of the first electrodes having first, second, third, and fourth sides, the first and the third sides facing each other, the second and the fourth sides facing each other, wherein:
   each of the pixels includes a plurality of sub-pixels arranged in the row direction,
   each sub-pixel includes a respective one of the first electrodes, and
   a first electrode of a sub-pixel at an n-th row and a first electrode of a sub-pixel at an (n+2)-th row in a same column are connected to different ones of the data lines, the sub-pixels in the n-th row and (n+2)-th row in the same column to emit a same color of light, wherein
   the plurality of pixels includes first and second pixels adjacent to each other in the row direction, and wherein:
   first electrodes of sub-pixels of the first pixel are connected to data lines at the first sides of the first electrodes of the sub-pixels of the first pixel and a gate line at the second sides of the first electrodes of the sub-pixels of the first pixel, and
   first electrodes of sub-pixels of the second pixel are connected to data lines at the third sides of the first electrodes of the sub-pixels of the second pixel and a gate line at the fourth sides of the first electrodes of the sub-pixels of the second pixel.

2. The display device as claimed in claim 1, wherein data lines of even-numbered columns and data lines of odd-numbered columns carry data signals of different polarities.

3. The display device as claimed in claim 2, wherein the first electrode of the sub-pixel in the n-th row and the first electrode of the sub-pixel in the (n+2)-th row in the same column carry data signals of different polarities.

4. The display device as claimed in claim 2, wherein:
   a first electrode of a sub-pixel in an m-th column and a first electrode of a sub-pixel in an (m+4)-th column in a same row are connected to different gate lines, and
   the first electrodes of the sub-pixels in the m-th column and the (m+4)-th column emit a same color of light.

5. The display device as claimed in claim 4, wherein the first electrode of the sub-pixel in the m-th column and the first electrode of the sub-pixel in the (m+4)-th column in the same row carry data signals of different polarities.

6. The display device as claimed in claim 2, wherein first electrodes of odd-pixels in the odd-numbered columns in a same row are connected to data lines at the first sides of the first electrodes of the odd-pixels and a gate line at the second sides of the first electrodes of the odd-pixels.

7. The display device as claimed in claim 6, wherein first electrodes of even-pixels in the even-numbered columns in the same row are connected to data lines at the third sides of the first electrodes of the even-pixels and a gate line at the fourth sides of the first electrodes of the even-pixels.

8. The display device as claimed in claim 2, wherein first electrodes of first group pixels in the n-th row and an (n+3)-th row in the same column are connected to a data line at the first sides of the first electrodes of the first group pixels and gate lines the second sides of the first electrodes of the first group pixels.

9. The display device as claimed in claim 8, wherein first electrodes of second group pixels in an (n+1)-th row and the (n+2)-th row in the same column are connected to a data line at the third sides of the first electrodes of second group pixels and gate lines at the second sides of the first electrodes.

10. The display device as claimed in claim 2, wherein each of the first electrodes is connected to one of the gate lines and one of the data lines through a switching element.

11. The display device as claimed in claim 10, wherein the switching element includes:
    a gate electrode extending from one of the gate lines;
    a semiconductor on the gate electrode;
    a source electrode connected to one of the data lines and overlapping the gate electrode; and
    a drain electrode spaced from the source electrode and overlapping the gate electrode.

12. The display device as claimed in claim 11, wherein the overlapping portion of the drain and gate electrodes has one of substantially an I shape, an L shape, or a T shape.

13. The display device as claimed in claim 2, wherein the sub-pixels of each of the pixels include a red sub-pixel, a green sub-pixel, a blue sub-pixel, and a white sub-pixel.

14. The display device as claimed in claim 13, wherein:
   sub-pixels of adjacent pixels in a row are arranged in a same sequence; and
   sub-pixels of adjacent pixels in a column are arranged in a different sequence.

15. The display device as claimed in claim 2, wherein each sub-pixel includes a second electrode which overlaps the first electrode via an insulating layer.

\* \* \* \* \*